United States Patent [19]

Blowes et al.

[11] Patent Number: 4,990,031
[45] Date of Patent: Feb. 5, 1991

[54] TREATMENT OF MINE TAILINGS

[76] Inventors: David W. Blowes; Carol J. Ptacek, both of 17-368 Bearinger Road, Waterloo, Ontario, Canada, N2L 6E7

[21] Appl. No.: 362,672

[22] Filed: Jun. 7, 1989

[30] Foreign Application Priority Data

Jun. 9, 1988 [GB] United Kingdom ............... 8813698

[51] Int. Cl.⁵ .............................................. E02C 3/00
[52] U.S. Cl. .................................. 405/263; 405/52; 405/128; 210/170; 210/747
[58] Field of Search .................. 405/52, 53, 128, 129, 405/253; 210/170, 747

[56] References Cited

U.S. PATENT DOCUMENTS

| | | | |
|---|---|---|---|
| 1,935,090 | 11/1933 | Holland | 405/129 |
| 3,586,624 | 6/1971 | Larson | 405/129 |
| 4,522,723 | 6/1985 | Kauffman | 210/611 |
| 4,624,604 | 11/1986 | Wagner et al. | 405/128 |

FOREIGN PATENT DOCUMENTS

| | | | |
|---|---|---|---|
| 1053918 | 5/1979 | Canada | 405/129 |
| 3041706 | 5/1982 | Fed. Rep. of Germany | 405/128 |
| 7614423 | 7/1977 | Netherlands | 405/129 |

OTHER PUBLICATIONS

"A Treatment of Acid Mine Water Using Sulfate Reducing Bacteria" (Wakoo et al., Journal of Ferment. Technol., vol. 57, No. 5, pp. 445–452, 1979).
"Microbial Sulfate Reduction and its Potential Utility as an Acid Mine Water Pollution Abatement Procedure" (Tuttle et al., Applied Microbiology, vol. 17, No. 2, Feb. 1969).
"Observations on a Microbial Cellulose Degradation Process that Decreases Water Acidity" (Jongejan, International Biodeterioration, vol. 22, No. 3, 1986).
"Leaching Characteristics of Uranium Tailings from Ontario and Northern Saskatchewan" (Silver, publ. by Canada Centre for Mineral and Energy Technology, Jun. 1983).
"Aquatic Plants and Bog Covers to Prevent Acid Generation-Base Metal Tailings" (Silver, Atlantic Institute of Biotechnology, Halifax, NS).

Primary Examiner—Dennis L. Taylor
Assistant Examiner—John Ricci
Attorney, Agent, or Firm—Anthony Asquith & Co.

[57] ABSTRACT

Mine tailings containing iron sulphides can cause acidity in groundwater travelling down through the tailings, if the tailings ever become exposed to the air. In the worst case, if only an upper level of the tailings becomes exposed, the amount of acidity produced is as if the whole body of tailings were exposed, because ferric ions in the water seeping down from the vadose region to the still-unexposed anaerobic regions tend to cause oxidation of the sulphides below, as if they too had become exposed. A layer of organic carbon (in the form of wood chippings, seaweed, etc) is added to the body of tailings, just below the (stabilized) water table. Water seeping down from the vadose region encounters the carbon before reaching the anaerobic sulphides, and most of the oxidation-producing tendency of the ions in this water is dissipated on the carbon, by bacterial action, leaving the anaerobic sulphides below unchanged. Further layers of organic carbon may be included, below the predicted level of the water table, as a safety factor to cater for errors or accidents that might affect the water table level.

9 Claims, 1 Drawing Sheet

TREATMENT OF MINE TAILINGS

This invention relates to a manner of treating mine tailings to reduce the possibility of groundwater pollution.

BACKGROUND OF THE INVENTION

Mine tailings are the waste materials which remain at a mine after the commercially-useful ore or other material has been extracted. The tailings comprise finely crushed solids, which are suspended in water to form a slurry, and the tailings are disposed of by pumping the slurry into a suitable impoundment.

The tailings comprise mainly crushed rock, which is harmless as far as possible pollution is concerned, but the tailings generally include also a number of minerals, which do have the potential to pollute the groundwater system.

Sulphide minerals comprise one class of minerals which is often present in tailings, and which has a high potential for pollution. A common such suphide mineral is iron (ferrous) sulphide, or pyrite.

When the tailings do contain pyrite, and if no precautions are taken to prevent it, pollution of the groundwater system occurs as follows.

The tailings impoundment is gradually filled up, and once full, the impoundment is abandoned. As the years go by, gradually the water-table falls to an equilibrium position within the tailings, and the pyrite above the water-table comes into contact with atmospheric oxygen. The pyrite therefore starts to oxidise. The reaction, in the presence of moisture, produces ferrous ions ($Fe++$), sulphate ions ($SO4--$), and hydrogen ions ($H+$).

The water containing these acid-producing ions is displaced down through the body of tailings, as further precipitation infiltrates from above. When this water becomes exposed to the atmosphere (as it inevitably will, sooner or later, when the water enters a stream or lake) the $Fe++$ in that water oxidises and produces a sulphuric acid solution.

The amount of acidity produced in the groundwater depends of course on the quantity of pyrite above the water table. But in fact, it is not just the pyrite that is exposed to the atmosphere that produces the acidity: even the pyrite that lies submerged below the water table contributes to the acidity problem. The main oxidation reaction that takes place in the exposed pyrite produces ferrous $Fe++$ ions and sulphate $SO4--$ ions, which enter the water seeping through the tailings. The ferrous ions in this seepage can then be oxidised further to ferric $Fe+++$ ions, which also enter the water seeping down through the tailings. Under the low pH conditions generated by pyrite oxidation, the ferric iron is displaced below the water table where the ferric ions come into contact with the as-yet un-oxidised $FeS2$ lying submerged below the water table.

Below the water table, the ferric ions react with the un-oxidised pyrite, producing yet more ferrous ions and more sulphate ions. The water that enters the groundwater system, through the floor of the impoundment, consequently contains substantial concentrations of ferrous and sulphate ions.

If the whole body of tailings could be kept permanently under water, very little oxidation of the pyrite would take place; but once the upper regions of the body of tailings have become exposed, a large portion of the whole body of tailings contributes to the production of acidity.

The invention is concerned with the problem, as described, of preventing acid-producing ions from entering the groundwater.

THE PRIOR ART

One way of preventing the acid-producing ions from entering the groundwater is to dump the tailings straight into deep water. If that is done, the pyrite does not have the opportunity to oxidise rapidly, and remains relatively inactive. Water may seep through a body of submerged tailings, and the emerging water will have picked up substantially no acid-producing ions.

However, there are problems associated with dumping the tailings in deep water. Often, the mine will be at a location where there is no deep lake of a large enough size that it will accept the huge quantities of tailings produced by a successful mine operation, and it is very expensive to erect a dam to produce a deep water lake. But if the tailings are dumped instead into a shallow lake, whether a natural one or one produced by a dam, there is a chance that the tailings might become exposed to the atmosphere, i.e. to oxygen.

Where it is not possible to dump the tailings in deep water, it has been proposed to cover the tailings with an oxygen-excluding barrier, to prevent oxidation of the tailings. It has been proposed to make this barrier from an artificial material, such as plastic sheeting laid over the tailings. One problem here is that such a barrier does not allow water to pass through at all, and so provision has to be made in addition for water run-off. It has also been proposed to place soil or clay over the tailings, and to plant suitable vegetation which will maintain an airtight layer.

The problem with such measures lies in the long-term security of the air-tight barrier. The pyrite can be expected to pose a pollution threat, if it should ever oxidise, more or less for ever, and no engineered air-tight barrier can be expected to last indefinitely.

Another problem with the air-tight barrier approach is that the barrier cannot be put in place until the whole body of tailings has accumulated, which may take years: meanwhile, the pyrite which may have been exposed in the meantime will oxidise, producing $H+$, $SO4--$, $Fe++$, and other metals which can then enter the groundwater. Usually, in a mine operation, the tailings remain submerged under water throughout the service life of the mine, or at least throughout the service life of the tailings-impoundment. But it can happen that the tailings become exposed to oxygen before the operations have ceased, and before the barrier is in place.

It has been proposed that, in places where there is already a pollution problem, water that contains the acid-producing ions may be treated with organic carbon. If this is done before the water comes into contact with atmospheric oxygen, bacterial action oxidises the organic carbon, and reduces the sulphate ions. The released sulphide ions recombine with the ferrous iron (and any other metallic) ions present, to form sulphides (including, once again, pyrite). Carbonate ions are also formed, but these produce relatively harmless precipitates, and their alkalinity acts to neutralise the water pH.

It has been proposed that the process of passing polluted groundwater through a vessel containing organic carbon therefore will cause the sulphate ions to reduce, and the sulphide materials thus produced will precipitate out of the water, and can be collected and removed. Of course, this process is only of short term benefit, and is for use if there is an immediate problem with acidic groundwater. The sulphides that are produced by the treatment still must be kept from oxidising, otherwise the pollution problem will start again. In practice, it turns out to be very expensive to collect all the polluted groundwater, very expensive to provide perpetually enough organic carbon, and very expensive to provide vessels large enough, to deal with the amount of acidity produced by a conventional body of tailings.

It is also very expensive to transport the quantities of precipitated sulphides to a deep water lake, where they can finally be dumped.

It is recognised that the bacterial reduction of sulphate ions in the presence of organic carbon can occur naturally. Many impoundments have been placed in areas which have a high peat content in the base-soil, and, in those cases, even though the tailings in the impoundment have been exposed to the air, it may be observed that the water that filters through such peat layers is relatively free from acid-producing ions. It is observed also, when the peat is examined, that sulphides have been precipitated onto the peat.

Furthermore, in existing impoundments, it happens often that trees fall into the impoundment and come to rest in the path of water that has passed through exposed pyrite. It has been observed that sulphides precipitate out onto the material of the buried trees. Again, this is an illustration of the fact that organic carbon is effective, when oxygen is excluded, to reduce the sulphate ions, the sulphur from which then recombines with the metallic ions present to form insoluble sulphides. So long as these sulphides do not become exposed, and start to oxidise, they are harmless.

GENERAL DESCRIPTION OF THE INVENTION

The invention lies, in its broadest aspect, in placing the organic carbon actually in the tailings impoundment.

In the invention, if the pyrite in the upper regions of the tailings should become exposed, and should oxidise, the sulphate ions contained in the water that seeps down from the oxidised pyrite are reduced by the organic carbon. The sulphides which form as a result of the reduction are precipitated out onto the organic carbon. Placing the carbon actually in the impoundment means that there is no need to collect the groundwater, no airtight vessels are required, and there is no need to transport the precipitated sulphides away.

It is preferred, in the invention, to place the organic carbon, not on the floor of the impoundment, but immediately below the water table level. When the carbon is placed on the floor of the impoundment, larger quantities of carbon are required.

It is recognised that the organic carbon would not be effective to reduce the sulphate ions if the carbon were itself exposed to the atmosphere. If the organic carbon were exposed to oxygen, the carbon would oxidise directly, and thus would no longer be able to protect the water against acidity. The organic carbon should therefore, in the invention, be placed below the future water table. Any organic carbon that might be present above the water table is largely ineffective for reducing the sulphate ions produced by the oxidation of the exposed pyrite.

Exposed carbon does not become ineffective immediately it is exposed. All but the topmost few cm can remain potentially protective for many years, but eventually, the protection afforded by exposed carbon is gone.

Whilst it is preferred that the carbon should, in the invention, be placed just below the water table, it is recognised that a safety margin should be left, to ensure that the carbon near the water table never actually becomes exposed. In the invention, the carbon should be placed as close as possible to the water table, commensurate with the requirement that the carbon should not become exposed.

It is recognised in the invention that the quantity of carbon needed to alleviate the acidity problem is much smaller, and in fact is quite manageable, when the carbon is added just below the water table, as compared with placing the carbon on the bed of the impoundment. It is recognised in the invention that only the pyrite above the carbon can produce acidity, and consequently the carbon should be placed as high in the body of tailings as possible, commensurate with the requirement that the carbon should not become exposed to the air.

The pyrite below the water table, and thus out of contact with oxygen, only contributes to the acidity if the water seeping down from above contains ferric $Fe+++$ ions, which, if present, would, as described previously, cause the submerged pyrite to oxidise, producing yet more ferrous ions and sulphate ions. Below the water table, the passage of the water from the exposed region, down through the organic carbon, reduces the sulphate and $Fe+++$ ions, and the released sulphide combines with the ferrous iron, and any other sulphophile metallic ions present. This produces insoluble sulphides, which precipitate out onto the carbon.

In addition, the oxidation of organic carbon generates bicarbonate ions ($HCO3-$) which represent a source of alkalinity which will consume at least part of the acidity ($H+$) generated by the sulphide oxidation reactions. Consequently, when the invention is used, water that emerges from the base of the tailings contains substantially low concentrations of ferrous ions, ferric ions, sulphate ions, and less acidity. It is not suggested that in the invention all potential acidity is absolutely eradicated; rather, the aim of the invention is to reduce the acidity of the emerging water, economically, to substantially harmless levels.

Such water can be allowed to continue to seep down through the submerged pyrite, and to enter the underlying groundwater. The water will pass through the submerged pyrite without picking up any further acid-producing ions.

In the invention, it is recognised that the quantity of carbon needed to alleviate acidity is determined not by the total quantity of pyrite contained in the whole body of tailings, but is determined solely by the quantity of pyrite contained in that portion of the tailings which lies above the carbon.

To determine the quantity of organic carbon required, a convenient general guide is that, to precipitate as FeS all the Fe contained in 1000 kg of pyrite above the carbon, 1000 kg of active organic carbon, calculated to be in the form of glucose, will be required. It is important to provide a safety factor also on the quantity of carbon provided, because if quantities of ferric ions do get through the carbon, these can cause oxidation of the submerged pyrite below, producing ferrous and sulphate ions which will then enter the groundwater system.

It is recognised in the invention that, when the carbon is placed just below the water table, even with a sizeable safety allowance, the quantity of carbon required is comparatively small.

DETAILED DESCRIPTION OF PREFERRED EMBODIMENT

By way of further explanation of the invention, an exemplary embodiment of the invention will now be described with reference to the accompanying drawings, in which.

The features of the impoundment and the process steps shown in the accompanying drawings and described below are examples which embody the invention. It should be noted that the scope of the invention is defined by the accompanying claims, and not necessarily by features of specific embodiments.

Figure 1:
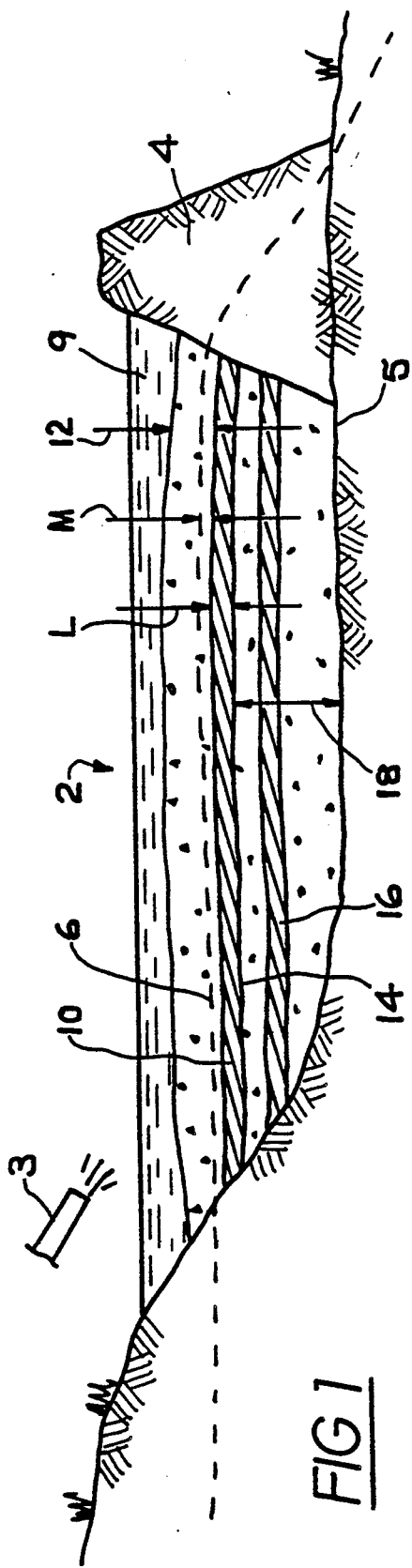
FIG. 1 is a cross-sectional view of an impoundment for containing mine tailings, in which acid pollution is alleviated in the manner of the invention.

FIG. 1 shows an impoundment 2 which is constructed for the purpose of receiving tailings from a mine.

A slurry comprising mine tailings suspended in water is pumped out of a discharge nozzle 3, into the impoundment 2. The tailings comprise generally the waste material that is left after the commercially useful ore has been extracted. Typically, the tailings include a mixture of finely broken rock together with pyrite (ferrous sulphide). Other minerals and substances may also be present in the tailings, depending on the particular ore being mined, and the type of ore treatment which is carried out at the mine.

A typical impoundment for receiving mine tailings may be 200 hectares in area. The tailings would be built up to a depth, typically, of 10 meters. The impoundment includes a dam wall 4, and a floor or bed 5. The dam wall need not be finished beforehand: the dam wall may be raised from time to time as the quantity of tailings builds up. It may be possible, depending on the lie of the land, to build up a quantity of tailings in the impoundment before the dam wall needs to be started.

A number of factors should be borne in mind by the designer of the impoundment. The chief of these is the need to determine the stabilization level to which the water table will settle, as the years go by. The permanent stabilization level of the water table depends on the lie of the land, the amount of precipitation, the nature of the underlying ground, the permeability of the dam wall, the drainage characteristics of the area prior to the impoundment being built, and so forth. Knowing, in addition, the make-up and porosity and the fineness of comminution of the tailings, and the final depth to which the tailings will be built, the expert designer can predict, with sufficient accuracy for the purposes of the invention, the permanent stabilization level at which the water table in the impoundment will settle, long after the impoundment has been finished with and abandoned.

Figure 2:
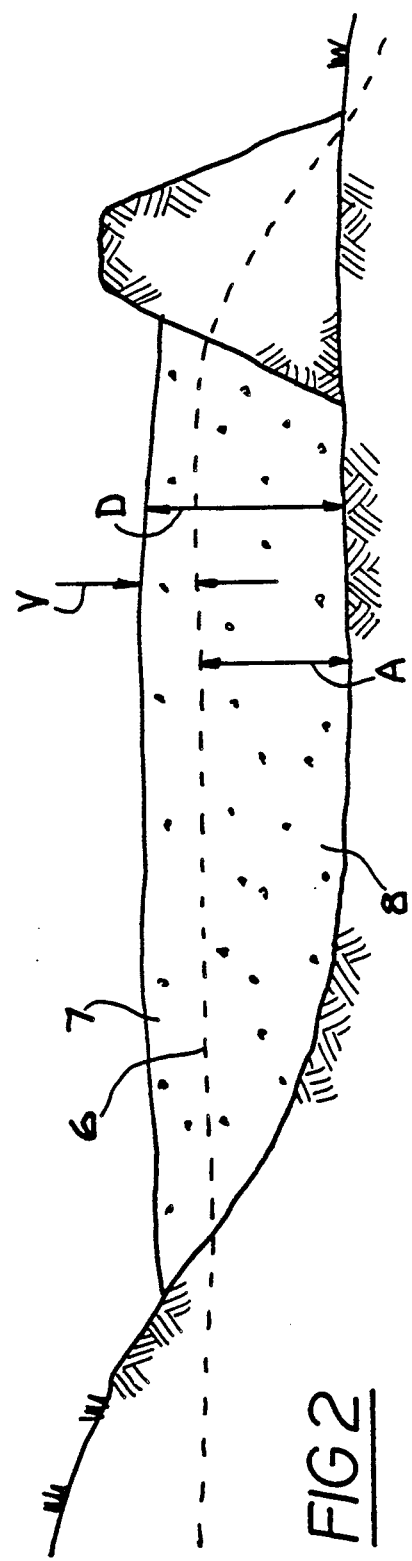
FIG. 2 is a diagrammatic representation of the impoundment shown in FIG. 1.

The calculation of the height of the stabilization level of the water table is very important to the invention. FIG. 2 represents a diagram drawn by the designer at the planning stage of the impoundment, before the impoundment is constructed. The diagram shows that the tailings will be built up to a total depth of D meters and the water table computations show that V meters of this total will eventually lie above the stabilised water table 6, in the vadose zone 7, and A meters will be below the water table, in the permanently saturated (and anaerobic) zone 8.

These calculations having been performed, the impoundment 2 is prepared, and operation of the impoundment commences. As the slurry is pumped out into the impoundment, the tailings are covered by the excess of water present in the slurry. As time goes by, the solid particles of the tailings settle, leaving substantially clear water 9 above. Such water usually does not contain harmful substances, and the water may be left to drain away naturally, or the water may be siphoned off, and discharged over the dam wall 4.

In the invention, the organic carbon should be of a form usable as a growth substrate by sulphate-reducing bacteria.

In accordance with the invention, organic carbon is to be added to the tailings. In the invention, the carbon may be added in discrete layers, which are separate from the tailings material, or the carbon may be interspersed with the tailings material.

When the organic carbon is to be added in a discrete layer, the following procedure may be used. The tailings are built up until the depth of the tailings approaches the level 6, i.e. the level at which, as determined by the calculations, the water table will stabilise. Just before the level 6 is reached, a layer 10 of organic carbon is added to the tailings.

In order to determine the amount of organic carbon to be included in the layer, the following items must be known:

1. In the available source of organic carbon, the percentage of the carbon that can be assumed to be degradable. 1000 kg of softwood waste, for example, can be assumed to yield 700 kg of degradable carbon.
2. The percentage of pyrite present in the tailings. This can vary from 5% to 95% of the mass of the tailings.
3. The height 12 of tailings that will lie above the carbon.

Ideally, the layer 10 of carbon should be placed immediately below the eventual water table 6. It is recognised in the invention that the quantity of carbon required depends on the quantity of tailings lying above the carbon, and does not depend on the depth of the tailings that will lie below the carbon.

For every 1000 kg of pyrite lying above the carbon layer 10, 1000 kg of degradable carbon should be included in the layer. On a depth basis, if in a particular source of organic carbon, 70% of the volume of the source yields degradable carbon, if the available organic carbon material has a specific gravity (dry) of 0.2, and if the tailings contain 10% pyrite, the height or depth L of the layer 10 of the organic carbon should be 0.61 meters for every meter of the height 12 of the tailings that will lie above the carbon layer 10.

In calculating this figure, it is assumed that all the Fe precipitates as FeS, i.e. as ferrous monosulphide. If it were to be assumed that all the Fe precipitates as $FeS_2$, i.e. pyrite, the calculated figure would be 1.21 meters of carbon for every meter of tailings that will lie above the carbon layer. It is somewhat unpredictable as to just what the ratio of FeS to $FeS_2$ will be in practice, and it is prudent to set the amount of carbon more to the $FeS_2$ level. Typically, the mix is mostly FeS, but a margin of safety is in any case desirable.

It may be noted that not all the sulphate ions need be taken out. It is the $Fe++$ ions which are the more dangerous. If the Fe++ were to be all removed, any sulphate remaining would be relatively harmless.

Thus, some margin for error should be made as regards the thickness of the carbon layer, but the margin requirement is not excessive, because the reactions that take place often tend not to take the most severe or dangerous form.

Apart from the margin on the quantity of organic carbon in the carbon layer 10, some margin for error should be allowed in the placement of the layer. If any of the carbon itself should become exposed, that carbon will (eventually) oxidise directly and will be wasted. Therefore, to be on the safe side, the layer 10 of carbon is placed a marginal depth M below the level 6, the computed stabilization level of the water table.

The quantity of carbon required is a function of the quantity of oxidizable sulphide minerals, usually pyrite. It is recognised in the invention that the pyrite that lies in the marginal zone 12, above the carbon layer 10, is also oxidizable, just like the pyrite that lies in the vadose zone 7. It is recognised also that the rate of acidity production in the marginal zone 12 is usually less than, but can be about the same as, the rate of acidity production in the vadose zone 7. In other words, as far as the amount of acidity produced is concerned, in the worst case it is as if the pyrite lying in the marginal, but anaerobic, zone 12 lay instead exposed to oxygen in the vadose zone 7.

Therefore, in order to determine the quantity of carbon required, the designer must take account of the acidity produced by the tailings in the marginal zone 12, in addition to taking account of the acidity produced by the quantity of tailings that will lie above the water table 6.

When the appropriate depth 14 of tailings has been reached, the layer 10 of carbon, of the calculated depth L, is put in place. How this is done depends on the nature of the organic carbon that is being used. If the carbon is in a form that will sink, the carbon may be formed into a slurry, and pumped onto the body of tailings, in the same manner as the tailings themselves. If the carbon is in a form that will float, for example wood-waste, it may be necessary to put the carbon material in sacks, and to add sufficient tailings into the sacks to make them sink. By the time the material of the sacks has degraded, the carbon will have become saturated enough not to float, and will in any case be covered over with the further tailings which are to be added above the carbon layer. The sacks of carbon material may be distributed over the body of tailings in some suitable manner, using a conveyor boom, or manually, using a boat.

In order to be effective, the layer of carbon should be properly distributed. If the carbon were to be so placed that water could pass through the layer 10 without coming into contact with the carbon, any acidity, or potential acidity, in that water would not be neutralised, and would enter the groundwater system.

The designer should take care that the bacterial action is adequately provided for, by which the sulphate is to be reduced under anaerobic conditions. The sulphate reducing bacterial are [{Desulfovibrio}] and [{Desulfomaculum}]. The designer should ensure that these bacteria will be present in adequate quantities, and can survive, in the carbon source material being used. A test program may be required, in a particular case, to ensure that the bacteria can function properly, and can survive.

If the depth 12 of the tailings to be added above the stabilised water table 6 is to be greater towards the centre of the impoundment, as will probably be the case, then it will be required that the depth L of the layer 10 also should be greater in the centre of the area of the impoundment, and should taper off towards the edges.

Once the layer 10 of carbon has been put in place, the rest of the tailings may be built up to the depth 12.

Throughout the time of the operation of building up the tailings in the impoundment, both before and after the placement of the carbon layer 10, it is usual that the impoundment will remain constantly under water, and that the tailings will be constantly submerged. It is only after operation of the impoundment has been discontinued for a period of time that the water level starts to fall, and the upper zones of the tailings become exposed.

In the ideal situation, it is possible to place just the one layer 10 of carbon, as described. The carbon is so placed as to lie as close to the stabilised water table 6 as possible, yet without the carbon actually becoming exposed.

However, it will sometimes be the case that the water table, when stabilised, will in fact turn out to lie below the calculated level. If this happens, and the layer 10 of carbon then becomes exposed, the carbon oxidises directly, and that carbon is useless then to prevent the water that flows through the impoundment, and into the groundwater, from picking up acidity.

Therefore, it is generally prudent to provide a back-up layer 16 of carbon, below the main layer 10.

In addition to providing back-up layers, it can also be advisable to split up the layer 10 itself into a number of sub-layers. It is recognised that the reduction of the sulphate ions takes place most vigorously at the interface between the tailings and the top of the carbon layer. By splitting the carbon layer 10 into sub-layers, the interface area between the tailings and the carbon can be increased.

There is also another reason for providing back-up layers of carbon, below the level 6 of the stabilised water table. The price of a mined commodity is something over which the operators of the mine have no control, and it can sometimes happen, if the world price falls, that a mine is abandoned for economic reasons. In particular, it can happen that operation of the mine can be suspended or abandoned before the tailings in the impoundment reach their final designed depth. Indeed, the mine might be abandoned before any carbon at all has been added. And naturally, if the impoundment contains less than the designed depth of tailings, the water table will stabilise at a lower level than predicted. These possibilities can be catered for to some extent by adding layers of carbon at intervals as the level of tailings is built up. The expense of providing these (hopefully redundant) layers of carbon is offset by the extra safety options.

It is not practically possible, after the tailings have been deposited, to come back later and insert layers of carbon into the existing body of tailings.

There is yet a further reason for adding extra layers of organic carbon, in addition to the main layer 10 just below the predicted stabilization level 6 of the water table. As the decades go by, it is expected that the tailings will consolidate into a self sustaining body, which would remain intact even if the dam wall 4, at some future date, might fail. If the dam wall does break, however, at the very least the water table will fall, thus exposing more tailings, but it might happen also, if the body of tailings has not fully consolidated, that the tailings will break up, and will spread over the ground in front of the broken dam. In such a case, if there is organic carbon in contact with the scattered tailings, it can be expected that the acidity produced by oxidation of the sulphides in those tailings will not be so severe. The more carbon present in the body of tailings, the better the chance that bacterial sulphate reduction will continue and that pollution can be avoided after a dam failure.

The organic carbon may be dispersed in the tailings, rather than being placed in the discrete layers as described above. In this case, the carbon is mixed into the slurry prior to pumping the slurry out into the impoundment. If the carbon is mixed with the slurry, the carbon used should be the kind that will not float. Carbon dispersed in the tailings will occupy a greater depth than the corresponding quantity of carbon disposed as a discrete layer. Therefore, more carbon is needed in the dispersion, since a greater depth of the tailings is potentially dangerous.

The carbon may be inserted into the tailings both as layers and as a dispersion. Bands of the dispersed mixture of tailings and carbon may be intercalated with bands of just tailings, at the appropriate depth.

It is preferred also to place a layer of carbon on the bed of the impoundment, prior to admitting any tailings. Such a layer provides a last ditch defence, to reduce acidity if the water table should fall drastically below the predicted level, and such a layer is comparatively easy and inexpensive to apply.

As described previously, it is however preferred, in the invention, that the carbon should not all be placed as a single layer on the floor or bed of the impoundment. As mentioned, if the upper regions of a body of tailings are exposed to the air while much of the body of tailings remains below the water table, the amount of acidity produced can be as much as the amount of acidity that would have been produced if the whole body of tailings had been exposed. Therefore, if the carbon were only placed on the bed of the impoundment, enough carbon would have to be provided to neutralise a much larger portion of the whole body of tailings, than is necessary if the organic carbon is placed near the water table.

Furthermore, if the carbon were all placed on the bed of the impoundment, that larger quantity of carbon would have to be put entirely in place before any tailings could be discharged into the impoundment. Placing the carbon only on the bed of the impoundment therefore will usually be much less economically attractive than placing the significantly smaller quantity of carbon as a layer just under the stabilised water table level.

Another problem with placing the carbon only on the floor of the impoundment is that water passing through the body of tailings does not always pass vertically straight down, but sometimes flows off to the sides, and even through the dam wall. It would be possible for such water to by-pass the carbon, if the carbon were only on the floor of the impoundment, and therefore for its acidity to enter the groundwater system.

By placing the carbon just under the water table, that part 18 of the body of tailings that lies below the carbon is rendered relatively harmless. It is recognised in the invention that a much smaller quantity of carbon is needed if the carbon is placed just under the water table.

As compared with dumping the tailings in deep water, storing the tailings in an impoundment does have the benefit that the tailings would be accessible, in case the minerals still remaining within them ever became useful commercially. Some long-abandoned tailings now in existence, for example, contain gold in sufficient quantities as to justify reprocessing.

Other species, including metals or metalloids may be present in the tailings, which are potentially toxic when released into the environment. These include copper, lead, zinc, nickel, arsenic and cobalt. These metals, like iron, readily form relatively insoluble sulphides, which may be caused to precipitate out onto the organic carbon, using the process steps of the invention. These species are removed from the tailings pore water and therefore are left in a collectable form, in the abandoned tailings if ever it becomes economically viable to reprocess the tailings to extract them.

It is contemplated in the invention that adding the layers of carbon may be combined with other steps for preventing acidity from reaching the groundwater system. For example, there is no reason why a cover could not be placed over the finished body of tailings, to prevent oxygen reaching the pyrite, even though the body of tailings contains the layer(s) of organic carbon, as described. The cover may be a sheet of airtight material, a layer of fine-grained geologic material (e.g. clay) or may be a layer of suitable vegetation. The tailings themselves, if comminuted finely enough, can become almost airtight. The inserted carbon may, in those cases, be regarded as a back-up measure, in case the more vulnerable air-tight cover should ever become damaged.

The carbon that resides in the layer(s) below the water table will resist degradation for a long period. One manner in which organic carbon does degrade under anaerobic conditions is by methanogenesis, in which the carbon is converted into methane by bacteriological action. However, the presence of even a small content of sulphates near the carbon is sufficient to slow down the methanogenesis, and in a body of tailings there is generally no shortage of sulphates.

The source material for the organic carbon can be whatever is available. Peat, other bog materials, or vegetated wetland soil can be used. So can wood, or softer vegetation, or even seaweed. The material should be chopped into small particles (e.g. 1 cu cm or so) prior to use. If the particles of the material were to be too small, however, or too widely dispersed, the bacterial action by which the sulphates are reduced would be inhibited.

We claim:

1. Procedure to prevent leakage of acidity from an impoundment of sulphide-containing tailings into groundwater, comprising the steps:
   of noting the total depth D meters to which the tailings will be built up in the impoundment;
   of assessing the drainage characteristics of the ground that lies under and around the impoundment, the likely precipitation, the porosity of the tailings and the like;
   on the basis of the assessments, of computing the level at which the water table in the impoundment will stabilize on a permanent basis, V meters of the depth D being above the water table, A meters of the depth D being below the water table;
   of building up a body of the tailings in the impoundment to a depth of just less than A meters;

of then adding on top of the body of tailings a layer of organic carbon;

where the layer is widespread over substantially the whole area of the body of tailings, and is substantially continuous over that whole area; and of then continuing to build the further tailings up on top of the said layer.

2. Procedure of claim 1 wherein the quantity of carbon in the layer is sufficient to remove the potential acidity produced by oxidation of the sulphides contained in the portion of tailings lying above the layer of carbon, but is not sufficient to neutralise the acid it has produced by oxidation of the sulphide contained in the total quantity of tailings in the impoundment.

3. Procedure of claim 1 wherein the layer of carbon is placed a marginal depth below the computed level of the stabilized water table.

4. Procedure of claim 1 wherein the said layer is the topmost one of at least two layers placed within the body of tailings.

5. Procedure of claim 4 wherein a layer of carbon is placed on the floor of the impoundment, prior to tailings being added to the impoundment.

6. Procedure of claim 1 wherein the tailings contain iron pyrite ($FeS_2$).

7. Procedure of claim 6 wherein the thickness of the layer of organic carbon is roughly equal to the depth of the tailings added on top of the layer.

8. An impoundment, in combination with a body of sulphide-containing tailings, wherein:

the level of the stabilized water table in the impoundment is such that V meters of the depth of the tailings lies above the stabilized water table, and A meters lies below the stabilized water table;

a layer of organic carbon material is included in the body of tailings, the layer being positioned slightly below the stabilized water table, the depth of the layer being substantially less than the depth A.

9. An impoundment, in combination with a body of sulphide-containing tailings, wherein:

the level of the stabilized water table in the impoundment is such that V meters of the depth of the tailings lies above the stabilized water table, and A meters lies below the stabilized water table;

a quantity of organic carbon material is included in the body of tailings, the quantity being positioned wholly below the stabilized water table, the quantity of the material being substantially less than the quantity of tailings below the stabilized water table.

* * * * *